(12) United States Patent
Hirayama et al.

(10) Patent No.: US 11,483,600 B2
(45) Date of Patent: Oct. 25, 2022

(54) DEMODULATION CIRCUIT, DEMODULATION METHOD, AND TRANSMITTER

(71) Applicant: SONY SEMICONDUCTOR SOLUTIONS CORPORATION, Kanagawa (JP)

(72) Inventors: Yuichi Hirayama, Kanagawa (JP); Tomoya Kojima, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/431,776

(22) PCT Filed: Dec. 24, 2019

(86) PCT No.: PCT/JP2019/050498
§ 371 (c)(1),
(2) Date: Aug. 18, 2021

(87) PCT Pub. No.: WO2020/174851
PCT Pub. Date: Sep. 3, 2020

(65) Prior Publication Data
US 2022/0116668 A1    Apr. 14, 2022

(30) Foreign Application Priority Data
Feb. 28, 2019   (JP) .............................. JP2019-035439

(51) Int. Cl.
*H04N 7/173* (2011.01)
*H04N 21/238* (2011.01)
(Continued)

(52) U.S. Cl.
CPC .......... *H04N 21/238* (2013.01); *H04H 20/76* (2013.01); *H04H 20/95* (2013.01); *H04N 5/455* (2013.01);
(Continued)

(58) Field of Classification Search
CPC ............... H04N 21/238; H04N 21/222; H04N 21/4382; H04N 5/455; H04N 7/102; H04H 20/76; H04H 20/95
See application file for complete search history.

(56) References Cited

U.S. PATENT DOCUMENTS

| 2004/0165666 A1 | 8/2004 | Kubo et al. |
| 2012/0151296 A1 | 6/2012 | Nishikawa |

(Continued)

FOREIGN PATENT DOCUMENTS

| CN | 102484558 A | 5/2012 |
| JP | 2004179854 A | 6/2004 |

(Continued)

OTHER PUBLICATIONS

International Search Report and Written Opinion of PCT Application No. PCT/JP2019/050498, dated Mar. 17, 2020, 08 pages of ISRWO.

*Primary Examiner* — Mulugeta Mengesha
(74) *Attorney, Agent, or Firm* — Chip Law Group

(57) ABSTRACT

Disclosed is a transmitter that includes a demodulation circuit and a transmitting-side back-end processing circuit. When a TLV packet superimposed on a broadcast wave and transmitted with a variable data length is to be converted to split TLV packets with a fixed data length, the demodulation circuit sets a speed for switching between L and H levels of a clock signal in such a manner that the speed for first data including a packet header to be embedded in a header section of the split TLV packets is twice the speed for data (Continued)

subsequent to the first data. The transmitting-side back-end processing circuit QAM-modulates a signal demodulated by the demodulation circuit for cable broadcasting purposes.

6 Claims, 7 Drawing Sheets

(51) Int. Cl.
*H04H 20/76* (2008.01)
*H04H 20/95* (2008.01)
*H04N 5/455* (2006.01)
*H04N 7/10* (2006.01)
*H04N 21/222* (2011.01)
*H04N 21/438* (2011.01)

(52) U.S. Cl.
CPC ........... *H04N 7/102* (2013.01); *H04N 21/222* (2013.01); *H04N 21/4382* (2013.01)

(56) References Cited

U.S. PATENT DOCUMENTS

| | | | |
|---|---|---|---|
| 2017/0064343 A1* | 3/2017 | Tsukagoshi | H04N 21/4343 |
| 2017/0118317 A1* | 4/2017 | Hasegawa | H04L 69/326 |
| 2017/0207869 A1* | 7/2017 | Iguchi | H04H 20/95 |
| 2017/0310530 A1* | 10/2017 | Kobatake | H04L 25/14 |
| 2018/0139033 A1 | 5/2018 | Okada et al. | |
| 2019/0200055 A1* | 6/2019 | Ebata | H04N 21/4343 |

FOREIGN PATENT DOCUMENTS

| | | |
|---|---|---|
| JP | 2011-049667 A | 3/2011 |
| WO | 2011/024405 A1 | 3/2011 |
| WO | 2016/199603 A1 | 12/2016 |
| WO | 2016/199604 A1 | 12/2016 |

* cited by examiner

| PACKET TYPE VALUE | ALLOCATION |
|---|---|
| 0x00 | UNDEFINED |
| 0x01 | IPv4 PACKET |
| 0x02 | IPv6 PACKET |
| 0x03 | IP PACKET WITH COMPRESSED HEADER |
| 0x04-0xFD | UNDEFINED |
| 0xFE | TRANSMISSION CONTROL SIGNAL PACKET |
| 0xFF | NULL PACKET |

DEMODULATION CIRCUIT, DEMODULATION METHOD, AND TRANSMITTER

CROSS REFERENCE TO RELATED APPLICATIONS

This application is a U.S. National Phase of International Patent Application No. PCT/JP2019/050498 filed on Dec. 24, 2019, which claims priority benefit of Japanese Patent Application No. JP 2019-035439 filed in the Japan Patent Office on Feb. 28, 2019. Each of the above-referenced applications is hereby incorporated herein by reference in its entirety.

TECHNICAL FIELD

The technology (the present technology) according to the present disclosure relates to a demodulation circuit for generating fixed-length packets by splitting a variable-length packet superimposed on a broadcast wave and transmitted, a demodulation method using a demodulation circuit, and a transmitter including a demodulation circuit.

BACKGROUND ART

New broadcasting methods, such as a transmission method for advanced wideband satellite digital broadcasting (ARIB STD-B44) and an ATSC 3.0-based broadcasting method, make it possible to transmit variable-length packets (e.g., TLV and ALP) in addition to currently-used fixed-length packets (e.g., TS). Disclosed, for example, in PTLs 1 and 2 are signal processing technologies that are applied, for instance, to digital broadcasting for transmitting variable-length packets through signal lines between a demodulation processing section and a demux processing section.

CITATION LIST

Patent Literature

[PTL 1]
PCT Patent Publication No. WO2016/199603
[PTL 2]
PCT Patent Publication No. WO2016/199604

SUMMARY

Technical Problem

However, in a case where a connection is to be made to a conventional back-end processing circuit (LSI) that is unable to receive variable-length packets, a header packet including, for example, a synchronization byte needs to be inserted into a fixed-length packet when a variable-length packet is split to generate fixed-length packets having a fixed packet length. When the technologies disclosed in PTLs 1 and 2 are used, clock frequency conversion needs to be performed to generate the fixed-length packets by splitting the variable-length packet. This causes a problem where the amount of buffer memory increases in an attempt to transmit at a fixed clock frequency.

In order to address the above problem, the present technology has an objective to provide a demodulation circuit capable of generating fixed-length packets in a simple format by splitting a variable-length packet, and provide a demodulation method using a demodulation circuit and a transmitter including a demodulation circuit.

Solution to Problem

When a TLV packet superimposed on a broadcast wave and transmitted with a variable data length is to be converted to split TLV packets with a fixed data length, a demodulation circuit according to an aspect of the present technology embeds a header section of the split TLV packets. In addition to this, the demodulation circuit sets a speed for switching between L and H levels of a clock signal in such a manner that the speed for first data is twice the speed for data subsequent to the first data.

When a TLV packet superimposed on a broadcast wave and transmitted with a variable data length is to be converted to split TLV packets with a fixed data length, a demodulation method according to an aspect of the present technology embeds a header section of the split TLV packets. In addition to this, the demodulation method sets a speed for switching between L and H levels of a clock signal in such a manner that the speed for first data is twice the speed for data subsequent to the first data.

A transmitter according to an aspect of the present technology includes a demodulation circuit and a transmitting-side back-end processing circuit. For cable broadcasting purposes, the transmitting-side back-end processing circuit QAM-modulates a signal demodulated by the demodulation circuit. When a TLV packet superimposed on a broadcast wave and transmitted with a variable data length is to be converted to split TLV packets with a fixed data length, the demodulation circuit embeds a header section of the split TLV packets. In addition to this, the demodulation circuit sets a speed for switching between L and H levels of a clock signal in such a manner that the speed for first data is twice the speed for data subsequent to the first data.

DESCRIPTION OF EMBODIMENTS

Figure 1:
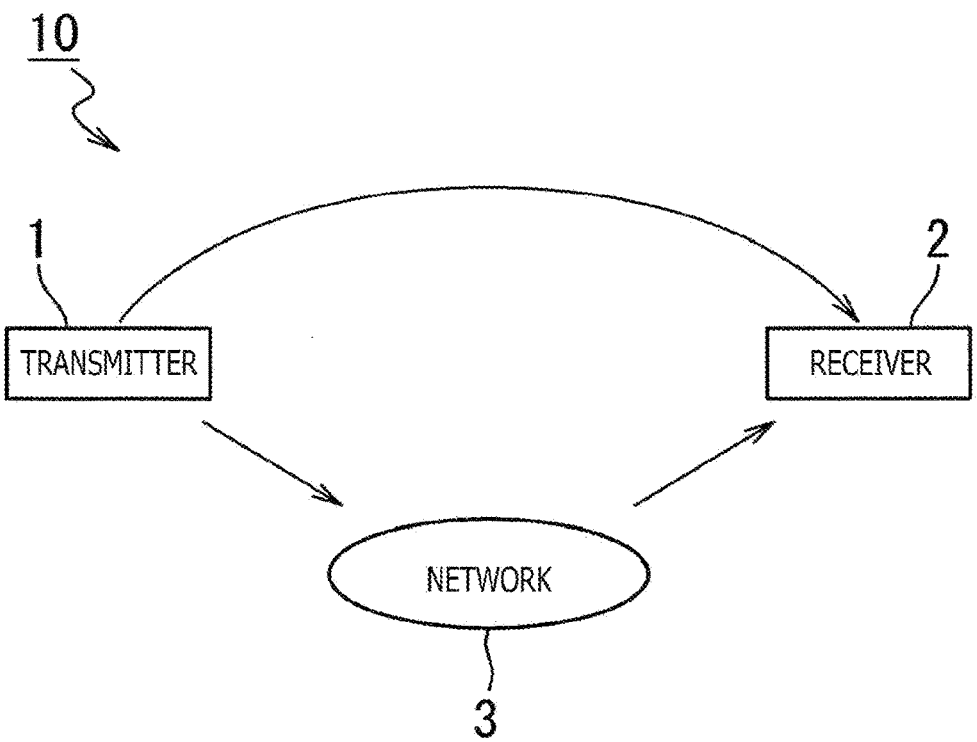
FIG. 1 is a diagram illustrating a configuration of a broadcasting system.

Embodiments of the present technology will now be described with reference to the accompanying drawings. In the drawings referred to in the following description, components identical or similar to each other are designated by identical or similar reference numerals, and will not be redundantly depicted. The individual drawings are schematic and occasionally different from real ones. The embodiments described below illustrate apparatuses and methods for embodying the technical ideas of the present technology. The technical ideas of the present technology are not specific to the apparatuses and methods illustrated in conjunction with the embodiments described below. The technical ideas of the present technology may be variously modified within a technical scope defined by the appended claims.

First Embodiment

As depicted in FIG. 1, a broadcasting system 10 is formed by a transmitter 1, a receiver 2, and a network 3.

The broadcasting system 10 is a system related to digital cable television broadcasting (cable broadcasting).

The transmitter 1 is a broadcasting station apparatus used for digital cable television broadcasting.

The receiver 2 receives a broadcast wave, which is transmitted from the transmitter 1, through the network 3. It should be noted that the transmission through the network 3 can include the transmission of information regarding broadcasting content.

<Configuration of Transmitter>

Figure 2:
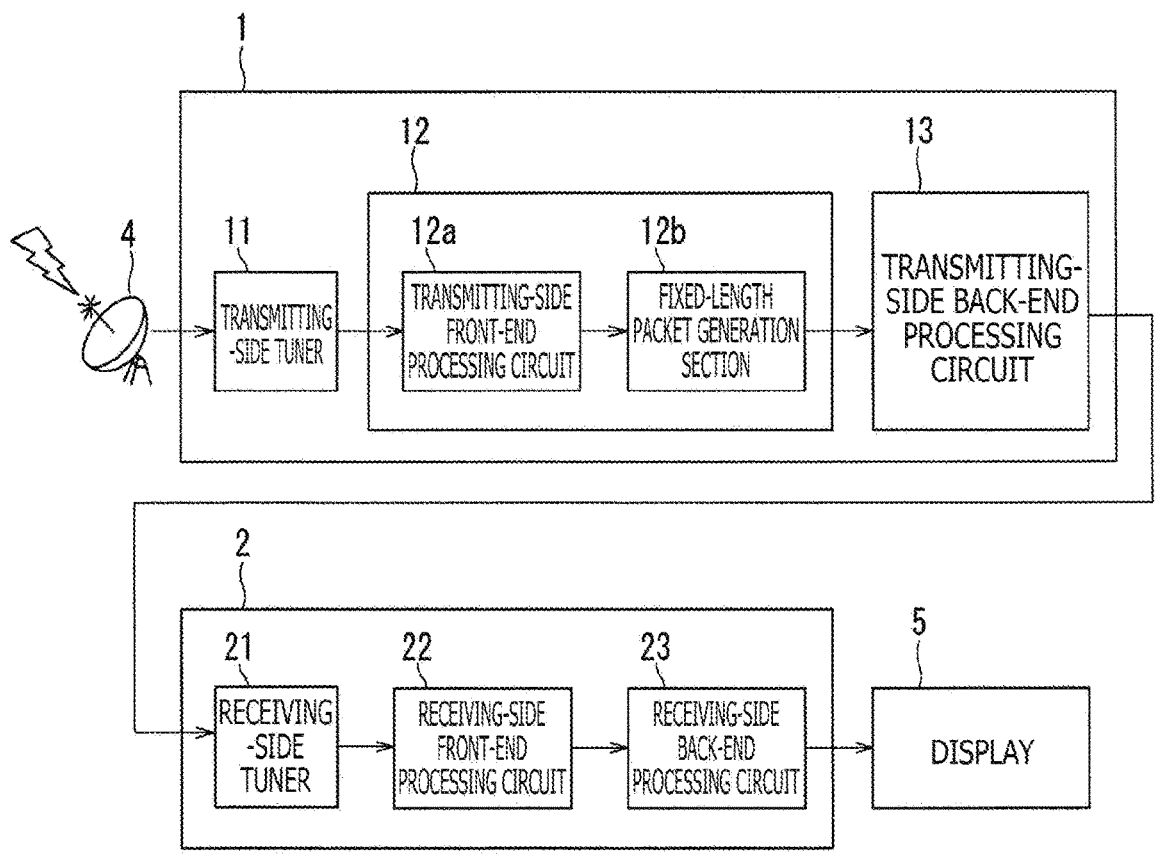
FIG. 2 is a block diagram illustrating a configuration of a transmitter and a configuration of a receiver.

As depicted in FIG. 2, the transmitter 1 includes a transmitting-side tuner 11, a demodulation circuit 12, and a transmitting-side back-end processing circuit 13. Alternatively, the transmitting-side tuner 11 and the demodulation circuit 12 may be formed by an LSI that is obtained by integrating the transmitting-side tuner 11 with the demodulation circuit 12.

The transmitting-side tuner 11 is connected to an antenna 4. The antenna 4 is an antenna that receives satellite broadcast.

The demodulation circuit 12 includes a transmitting-side front-end processing circuit 12a and a fixed-length packet generation section 12b.

Figure 3:
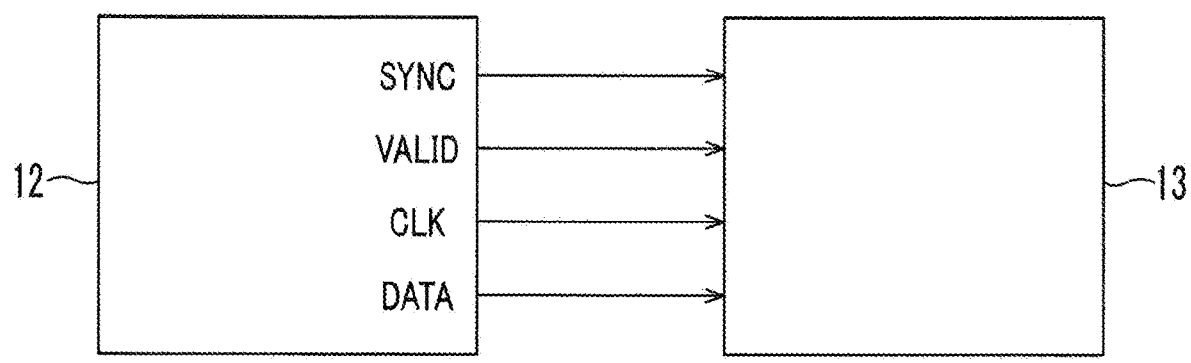
FIG. 3 is a diagram illustrating signal lines.

As depicted in FIG. 3, the demodulation circuit 12 and the transmitting-side back-end processing circuit 13 are connected with a plurality of signal lines, namely, four signal lines (in a case of serial transmission). The four signal lines are a synchronization signal line, a valid signal line, a clock signal line, and a data signal line.

The synchronization signal line is a 1-bit signal line for transmitting a synchronization (SYNC) signal. The valid signal line is a 1-bit signal line for transmitting a valid (VALID) signal. The clock signal line is a 1-bit signal line for transmitting a clock (CLK) signal.

The data signal line is a 1-bit signal line for transmitting a data (DATA) signal. It should be noted that the data signal line is capable of handling 1 to 8 bits. Therefore, the data signal line may be formed by one to eight signal lines. For example, in the case of serial transmission, the data signal line is formed by one signal line. Meanwhile, in a case of 8-bit parallel transmission, the data signal line is formed by eight signal lines.

As described below, the present technology is capable of controlling each of the synchronization signal, the valid signal, and the clock signal according to the number of data signal lines (the number of bits transmitted within one cycle of the clock signal).

Figure 4:
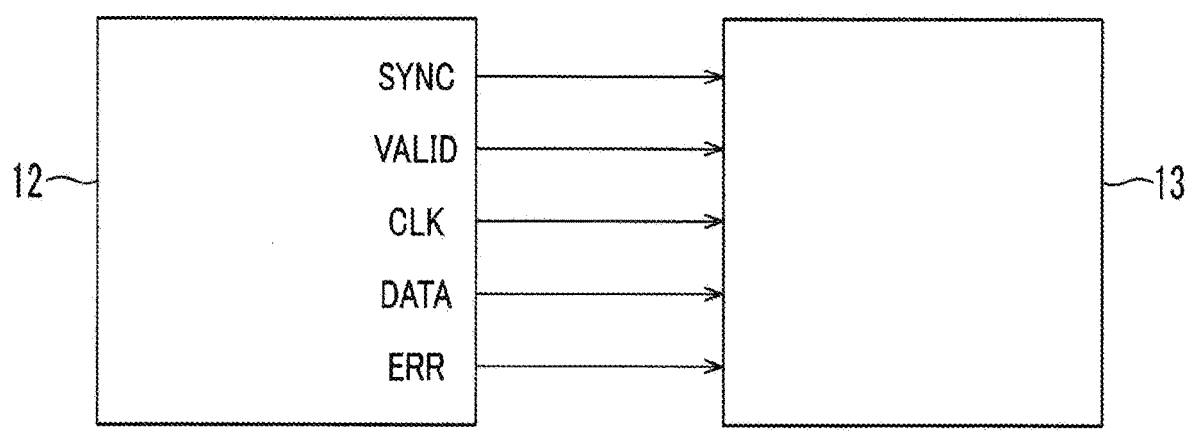
FIG. 4 is a diagram illustrating signal lines.

Alternatively, as depicted in FIG. 4, the demodulation circuit 12 and the transmitting-side back-end processing circuit 13 may include a plurality of signal lines, namely, an error signal line in addition to the four signal lines.

The error signal line is a 1-bit signal line for transmitting error information indicating the occurrence of an error (ERR). It should be noted that the signal lines depicted in FIGS. 3 and 4 are merely illustrative and not restrictive. Obviously, a signal line for transmitting another signal may be disposed between the transmitting-side front-end processing circuit 12a and the fixed-length packet generation section 12b.

Figure 5:
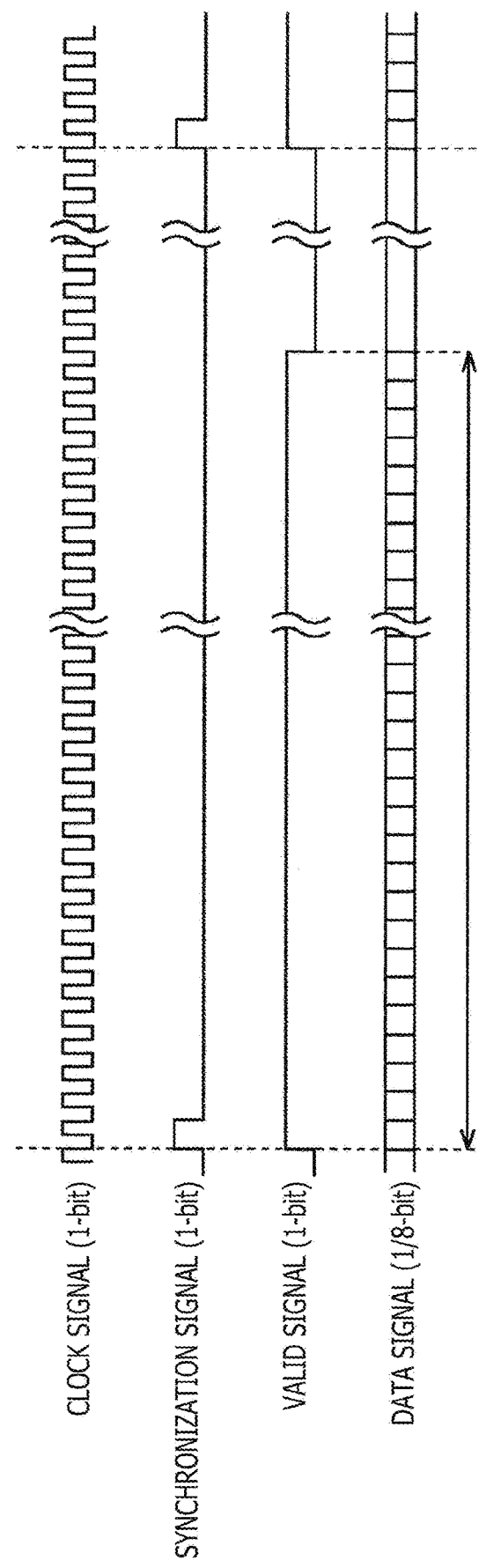
FIG. 5 is a diagram illustrating signals transferred through signal lines.

FIG. 5 depicts basic output waveforms of the clock signal, synchronization signal, valid signal, and data signal. The basic output waveforms are defined in order to explain the roles of the individual signals. Further, as described later, the waveforms of the individual signals are appropriately changed, for example, to meet the requirements of the transmitting-side back-end processing circuit 13 and reduce the amount of power consumption.

The clock signal is a signal indicating the output timing of data included in a fixed-length packet. The clock signal alternates between the L level and the H level. The synchronization signal indicates the timing of the beginning of a packet included in a fixed-length packet. For example, the synchronization signal temporarily switches from the L (Low) level to the H (High) level only at a timing of the beginning of the packet. The valid signal indicates a period (valid period) during which a TLV packet exists. For example, the valid signal goes to the H level during a valid period and goes to the L level during a period other than the valid period (an invalid period). The data signal is a signal of a fixed-length packet. The packet has a data length (packet length) of 188 bytes.

It should be noted that an error signal is additionally transmitted in a case where the error signal line is provided. The error signal goes to the H level when an error has occurred and goes to the L level when no error has occurred.

The data signal supplied from the demodulation circuit 12 to the transmitting-side back-end processing circuit 13 represents the whole fixed-length packet.

Upon detecting a frame synchronization signal for synchronizing frames, the transmitting-side front-end processing circuit 12a performs processing on each frame as described below. The following description relates to an example where 120 slots are included in one frame.

The transmitting-side front-end processing circuit 12a demodulates a main signal modulated by APSK (amplitude and phase-shift keying) or PSK. Additionally, the transmitting-side front-end processing circuit 12a demodulates a transmission TMCC signal modulated by $\pi/2$-shift BPSK. The transmission TMCC signal is a signal obtained by adding a BCH code or an LDPC code to a TMCC (Transmission & Multiplexing Configuration Control) signal. It should be noted that the TMCC signal in each frame includes TMCC information regarding each of the slots included in a frame. Further, the transmitting-side front-end processing circuit 12a obtains the TMCC information by performing an external code error detection correction process and an internal code error detection correction process on the TMCC signal. The external code error detection correction process decodes the BCH code. The internal code error detection correction process decodes the LDPC code. Furthermore, the transmitting-side front-end processing circuit 12a demodulates a main signal included in each slot in a target frame on the basis of information required for demodulating the main signal included in each slot in the target frame. This information is included in the TMCC information. It should be noted that the information required for demodulating the main signal is, for example, a parameter representing a carrier modulation scheme for each slot or a parameter representing a code rate for LDPC codes. Moreover, the transmitting-side front-end processing circuit 12a performs a deinterleaving process on the main signal in a slot.

By applying an error correction method using a BCK code and an LDPC code, the transmitting-side front-end processing circuit 12a performs error correction on a demodulated signal inputted from the transmitting-side front-end processing circuit 12a. Further, the transmitting-side front-end processing circuit 12a outputs TLV packets (a plurality of TLV packets) derived from error correction to the fixed-length packet generation section 12b.

Figures 6, 7:
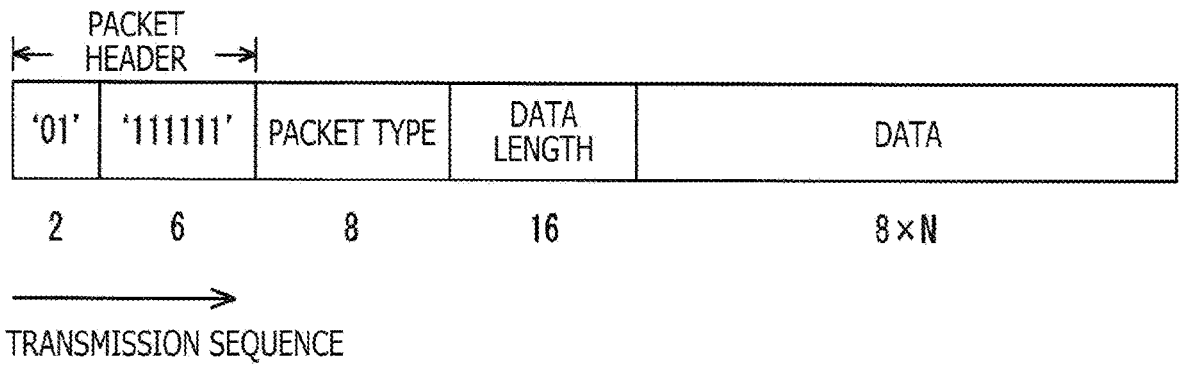
FIG. 6 is a diagram illustrating packet types of TLV packets.
FIG. 7 is a diagram illustrating a configuration of a TLV packet.

A packet type region is allocated as the region used for identifying the type of a packet to be stored in a TLV packet (see FIG. 6).

As depicted in FIG. 7, a data length region is a region where the number of data bits subsequent to the data length region is written. A data region, which is 8×N bits in length, is a variable-length region where data is written.

Figure 8:
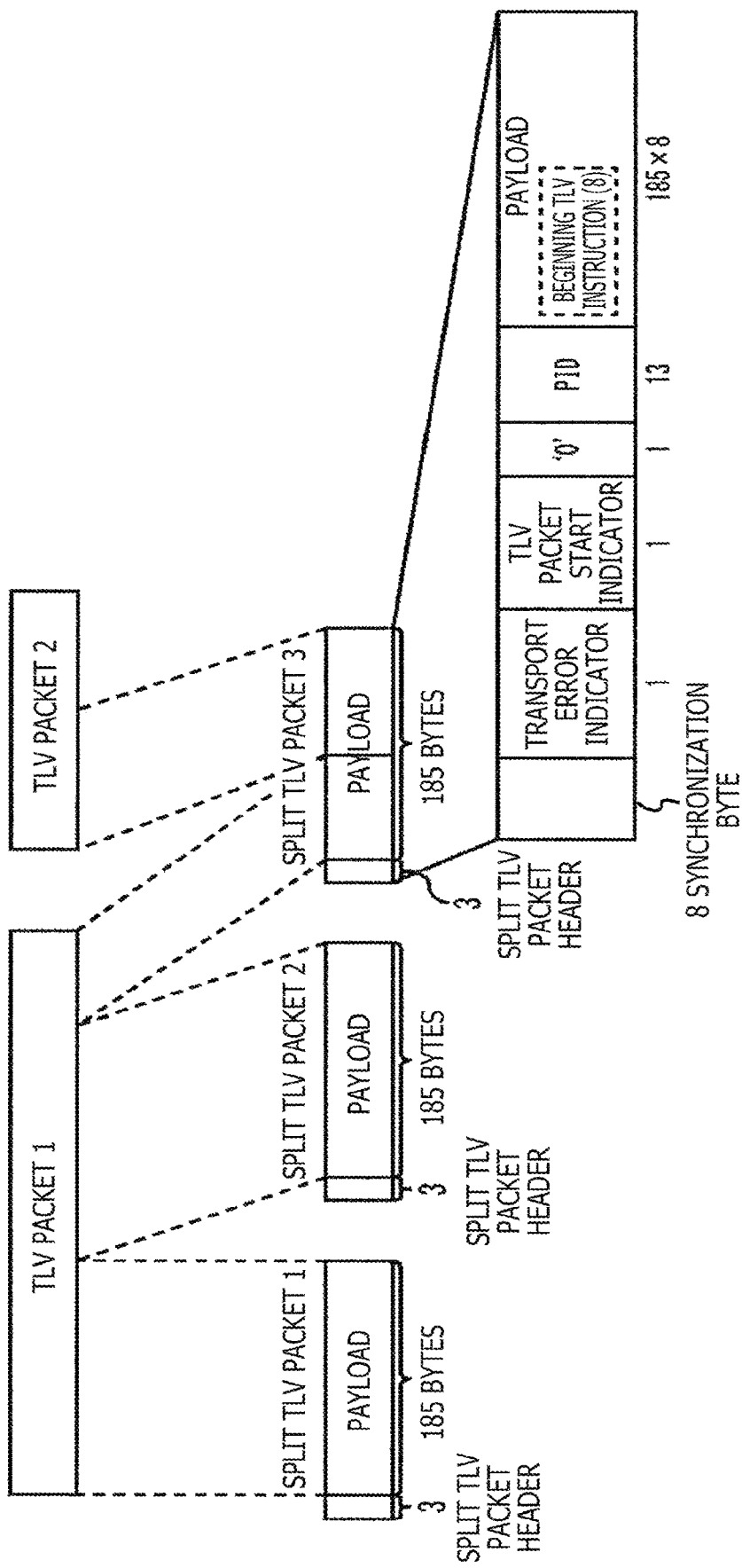
FIG. 8 is a diagram illustrating a process for converting TLV packets to split TLV packets.

In a case, for example, of a split TLV compliant with JCTEA STD-002-6.1 (multiple-carrier method), the fixed-length packet generation section 12b performs a process of converting received TLV packets into split TLV packets as depicted in FIG. 8. The TLV packets received by the fixed-length packet generation section 12b form a set of variable-length TLV packets. The fixed-length packet generation section 12b then converts the set of variable-length TLV packets into split TLV packets having a fixed length. FIG. 8 depicts an example where two TLV packets (TLV packet 1 and TLV packet 2) are converted into three split TLV packets (split TLV packet 1, split TLV packet 2, and split TLV packet 3).

The split TLV packets are packets having a fixed length of 188 bytes.

Further, as depicted in FIG. 8, the split TLV packets each include a synchronization byte, a transport error indicator, a TLV packet start indicator, a PID, and a payload. The payload may include a beginning TLV instruction.

The synchronization byte is defined, for example, as "0×47."

The transport error indicator is a flag indicating whether or not a bit error is present in a split TLV packet. When, for example, the transport error indicator is "1," it indicates that an uncorrectable error of at least one bit is present in a split TLV packet.

Furthermore, when the TLV packet start indicator is "1," it indicates that the beginning of a TLV packet is included in the payload of a split TLV packet. For example, split TLV packet 2 includes TLV packet 1 only, and excludes the beginning of TLV packet 1. Therefore, the TLV packet start indicator of split TLV packet 2 is "0." Meanwhile, for example, split TLV packet 3 includes TLV packet 1 and TLV packet 2, and additionally includes the beginning of TLV packet 2. Therefore, the TLV packet start indicator of split TLV packet 3 is "1."

The PID is a region used for identifying that payload data is TLV data.

The beginning TLV instruction represents the first one byte of a payload that is used when the TLV packet start indicator is "1." The value of the beginning TLV instruction indicates which byte of the payload where the beginning of a TLV packet is located. This enables the receiving side to detect the location of the beginning of a TLV packet included in the payload of a split TLV packet. When the TLV packet start indicator is "0," the beginning TLV instruction is not inserted into the payload.

Figure 9:
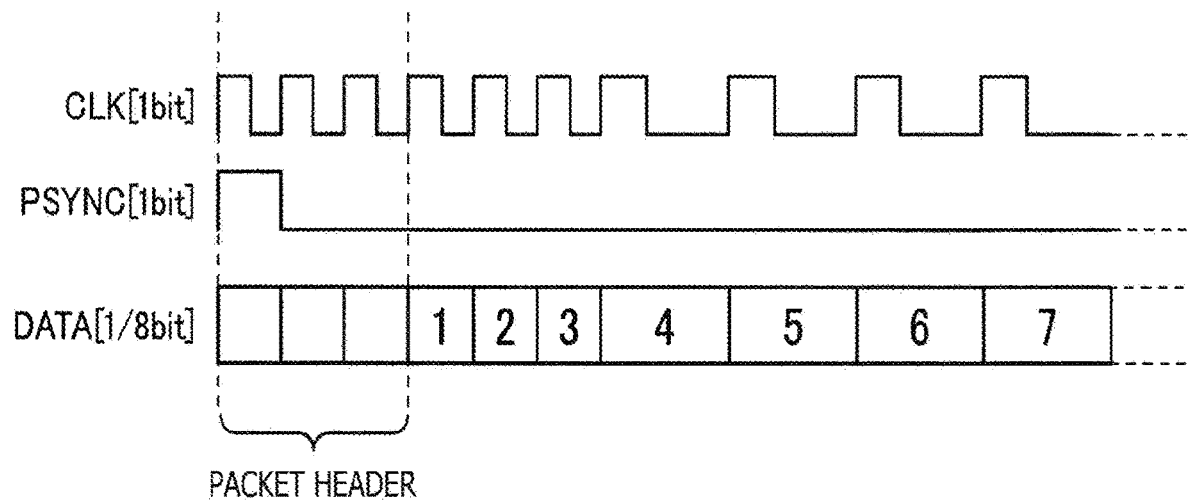
FIG. 9 is a diagram illustrating a process performed by a fixed-length packet generation section.
Figure 10:
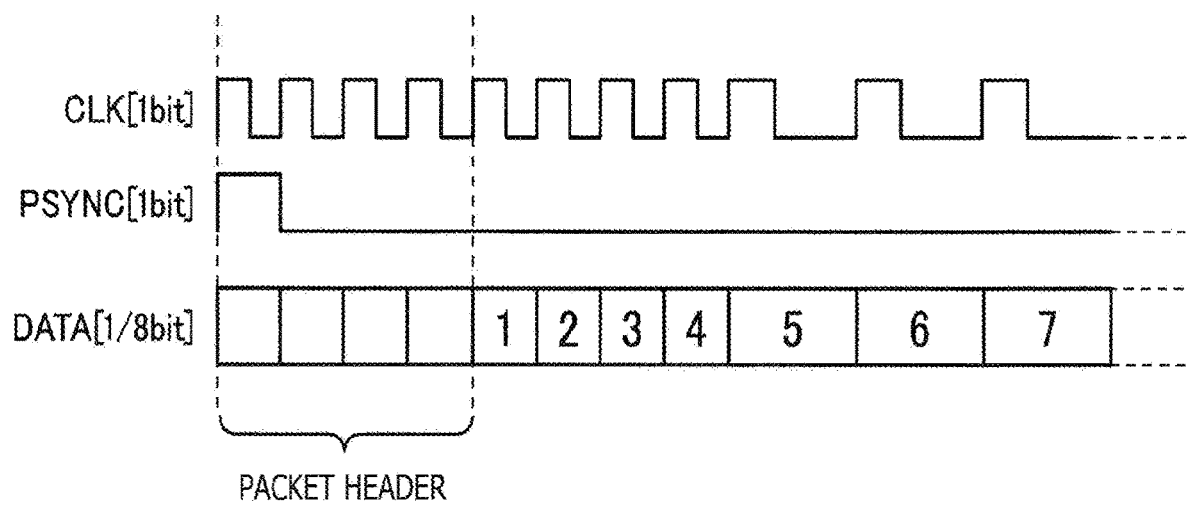
FIG. 10 is a diagram illustrating a process performed by the fixed-length packet generation section.

When converting a TLV packet having a variable data length into a split TLV packet having a fixed data length, the fixed-length packet generation section 12b embeds, as depicted in FIGS. 9 and 10, the synchronization byte, the transport error indicator, the TLV packet start indicator, "0," the PID, and 3- or 4-byte information including the beginning TLV instruction, which are depicted in FIG. 8, in a header section of the split TLV packet. It should be noted that FIGS. 9 and 10 depict an example where the multiple-carrier method is applied in a format for converting a TLV packet into a split TLV packet having a data length of 188 bytes.

Incidentally, in a case where the beginning TLV instruction is not included in the split TLV packet to be obtained by conversion, as depicted in FIG. 9, the first three bytes of data are embedded, as a packet header, in the header section of the split TLV packet. Additionally, a speed for switching between the L and H levels of the clock signal is set in such a manner that the speed for the first six bytes of data including the packet header is twice the speed for data subsequent to the first six bytes of data. More specifically, in a case where the beginning TLV instruction is not included in a received TLV packet, the speed for switching between the L and H levels of the clock signal is set in such a manner that the speed for only the first six bytes of data in the split TLV packet is twice the speed for data subsequent to the first six bytes of data.

Meanwhile, in a case where the beginning TLV instruction is included in the split TLV packet to be obtained by conversion, as depicted in FIG. 10, the first four bytes of data are embedded, as the packet header, in the header section of the split TLV packet. Additionally, the speed for switching between the L and H levels of the clock signal is set in such a manner that the speed for the first eight bytes of data including the packet header is twice the speed for data subsequent to the first eight bytes of data. More specifically, in a case where the beginning TLV instruction is included in the received TLV packet, the speed for switching between the L and H levels of the clock signal is set in such a manner that the speed for only the first eight bytes of data in the split TLV packet is twice the speed for data subsequent to the first eight bytes of data.

Further, the fixed-length packet generation section 12b sets the speed for switching between the L and H levels of the clock signal in such a manner that the speed for only the first six or eight bytes of data in the split TLV packet is twice the speed for data subsequent to the first six or eight bytes of data.

The transmitting-side back-end processing circuit 13 converts a broadcast wave supplied from the demodulation circuit 12 into a broadcast wave for digital cable television broadcasting. The broadcast wave (digital broadcast wave) obtained by conversion is then transmitted to the receiver 2 through a cable (cable television transmission path). The following example describes a case where a digital broadcast wave transmitted from the transmitter 1 to the receiver 2 is to be split-transmitted so as to include two carrier waves modulated by 256-QAM and one carrier wave modulated by 64-QAM.

The transmitter 1 uses 64-QAM and 256-QAM as modulation methods based on a transmission capacity required for the transmission of the main signal. The transmitter 1 then generates the main signal in units of slots. In this instance, the transmitter 1 modulates the main signal in each slot by using a modulation method selected for a main signal slot.

Therefore, the transmitter 1 converts a TLV packet into split TLV packets, then subjects the obtained split TLV packets to cable modulation, and transmits the resulting split TLV packets to the receiver 2 through the cable.

As described above, the transmitter 1 includes the demodulation circuit 12 having the fixed-length packet generation section 12b. When converting a TLV packet having a variable data length into a split TLV packet having a fixed data length, the fixed-length packet generation section 12b embeds the packet header in the header section of the split TLV packet. Additionally, the fixed-length packet generation section 12b sets the speed for switching between the L and H levels of the clock signal in such a manner that the speed for the first three or four bytes of data including the packet header is twice the speed for data subsequent to the first three or four bytes of data. Further, the transmitter 1 includes the transmitting-side back-end processing circuit 13, which QAM-modulates a signal demodulated by the demodulation circuit 12 in a manner appropriate for digital cable television broadcasting compliant, for example, with JCTEA STD-002-6.1 (multiple-carrier method).

Moreover, as described earlier, a digital broadcast wave based on the MMT/TLV method is used for satellite broadcasting. Therefore, the transmitter 1 converts the digital broadcast wave based on the MMT/TLV method to split TLV packets, and transmits the resulting split TLV packets as the broadcast wave for digital cable television broadcasting.

<Configuration of Receiver>

As depicted in FIG. 2, the receiver 2 includes a receiving-side tuner 21, a receiving-side front-end processing circuit 22, and a receiving-side back-end processing circuit 23.

The receiving-side tuner 21 receives a digital broadcast wave (split TLV packet) transmitted from the transmitter 1 through a cable, and supplies the digital broadcast wave to the receiving-side front-end processing circuit 22.

The receiving-side front-end processing circuit 22 is an LSI that handles demodulation processing. The receiving-side back-end processing circuit 23 is an LSI that handles demux processing. The receiving-side front-end processing circuit 22 and the receiving-side back-end processing circuit 23 can be formed by a single LSI or by different LSIs. In a case where the receiving-side front-end processing circuit 22 and the receiving-side back-end processing circuit 23 are formed by different LSIs, the receiving-side front-end processing circuit 22 needs to enable the receiving-side back-end processing circuit 23, which is disposed so as to follow the receiving-side front-end processing circuit 22, to perform processing. More specifically, in a case where the receiving-side front-end processing circuit 22 and the receiving-side back-end processing circuit 23 are formed by different LSIs, the receiving-side front-end processing circuit 22 needs to output data in such a manner as to meet the requirements of the receiving-side back-end processing circuit 23.

In view of the above circumstances, the receiving-side front-end processing circuit 22 supplies demodulated data in such a manner as to meet the requirements of the receiving-side back-end processing circuit 23. It should be noted that the subsequent description relates to an example where the receiving-side front-end processing circuit 22 and the receiving-side back-end processing circuit 23 are formed by different LSIs.

The receiving-side front-end processing circuit 22 demodulates a received QAM-modulated signal that is supplied from the receiving-side tuner 21. Further, the receiving-side front-end processing circuit 22 performs error correction on the demodulated signal by using an error correction method that uses a Reed-Solomon code as an error correction code. Furthermore, the receiving-side front-end processing circuit 22 supplies, to the receiving-side back-end processing circuit 23, either a split TLV packet derived from error correction or a TLV packet obtained by conversion.

As described above, the receiving-side front-end processing circuit 22 acquires a split TLV packet. Therefore, the receiving-side front-end processing circuit 22 outputs, to the receiving-side back-end processing circuit 23, either a split TLV packet or a TLV packet obtained by conversion.

The receiving-side back-end processing circuit 23 is formed, for example, by using an SOC (System-on-a-chip). The receiving-side back-end processing circuit 23 performs a process (demux processing) of dividing the split TLV packet or the TLV packet obtained by conversion, which are outputted from the receiving-side front-end processing circuit 22, namely, for example, video content, into a video part, an audio part, a subtitle part, and other parts.

Further, the signals (synchronization signal, valid signal, data signal, and clock signal) outputted from the receiving-side front-end processing circuit 22 are supplied to the receiving-side back-end processing circuit 23. The receiving-side back-end processing circuit 23 then separates data, such as video data and audio data, from the supplied signals. Furthermore, the receiving-side back-end processing circuit 23 generates video and audio signals by performing a process decoding the video data into a video signal and a process of decoding the audio data into an audio signal, and outputs the generated video and audio signals to a display 5.

<Operations>

Referring now to FIGS. 1 to 10, operations performed by the transmitter 1 will be described by using FIG. 11.

Figure 11:
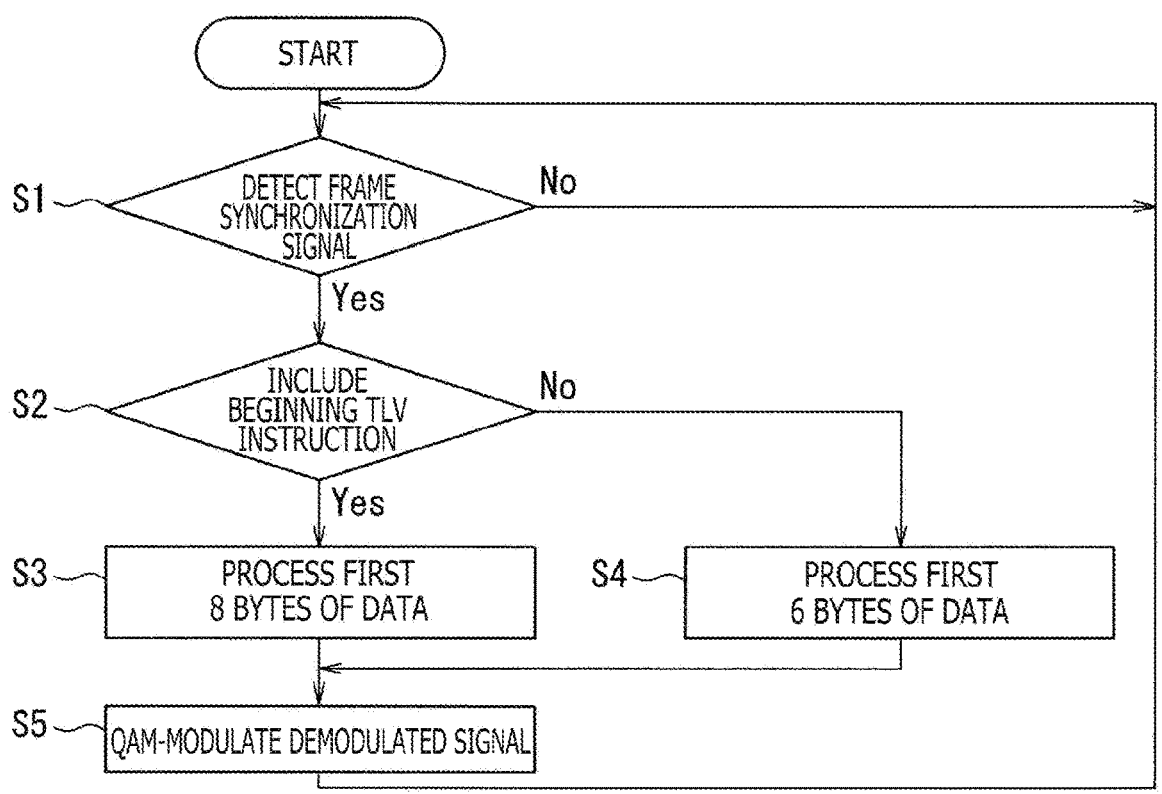
FIG. 11 is a flowchart illustrating operations of the transmitter.

As depicted in FIG. 11, upon each reception of the frame synchronization signal in step S1, the transmitter 1 performs a series of processing steps, namely, steps S2 to S5.

In step S2, the transmitter 1 determines whether or not the beginning TLV instruction is included in a split TLV packet to be converted. If it is determined in step S2 that the beginning TLV instruction is included in the split TLV packet to be converted, the transmitter 1 proceeds to step S3. Meanwhile, if it is determined in step S2 that the beginning TLV instruction is not included in the split TLV packet to be converted, the transmitter 1 proceeds to step S4.

In step S3, the transmitter 1 performs a process of embedding the first four bytes of data in the header section of the split TLV packet as the packet header. Additionally, the transmitter 1 performs a process of setting the speed for switching between the L and H levels of the clock signal in such a manner that the speed for only the first eight bytes of data in the split TLV packet is twice the speed for data subsequent to the first eight bytes of data.

In step S4, the transmitter 1 performs a process of embedding the first three bytes of data in the header section of the split TLV packet as the packet header. Additionally, the transmitter 1 performs a process of setting the speed for switching between the L and H levels of the clock signal in such a manner that the speed for only the first six bytes of data in the split TLV packet is twice the speed for data subsequent to the first six bytes of data.

In step S5, after the transmitting-side back-end processing circuit 13 QAM-modulates a signal demodulated by the demodulation circuit 12 for cable broadcasting purposes, the transmitter 1 outputs the QAM-modulated signal to the receiver 2.

<Demodulation Method>

A demodulation method used by the demodulation circuit 12 according to the first embodiment is to embed a packet header in the header section of a split TLV packet having a fixed data length when converting a TLV packet having a variable data length into the split TLV packet.

Further, the demodulation method used by the demodulation circuit 12 sets the speed for switching between the L and H levels of the clock signal in such a manner that the speed for the first six or eight bytes of data including the packet header is twice the speed for data subsequent to the first six or eight bytes of data.

In a case where a TLV packet is to be converted into split TLV packets by using a conventional method, it is necessary to perform a process of inserting a header packet into the beginning of the split TLV packets. This makes it necessary to add a memory to the fixed-length packet generation section 12b. Additionally, when the memory performs buffering, a process of converting a clock frequency needs to be performed. Therefore, in a case where the header packet has a fixed length of three bytes, the resulting data rate is equal to (188/185)×original data rate, and the clock frequency is similarly increased by 188/185. Further, in a case where the header packet has a fixed length of four bytes, the resulting data rate is equal to (188/184)×original data rate, and the clock frequency is similarly increased by 188/184. However, whether the header packet is three bytes or four bytes in length is not determined. Therefore, a large buffer size is required for smoothing the clock frequency.

Meanwhile, the configuration according to the first embodiment eliminates the necessity of converting the clock frequency, and makes it possible to generate fixed-length packets by splitting a variable-length packet without requiring a memory for buffering. Therefore, a TLV packet having a variable data length can be converted into split TLV packets having a fixed data length of 188 bytes without adding a memory to the fixed-length packet generation section 12b.

Consequently, the configuration according to the first embodiment makes it possible to provide the demodulation circuit 12 that is able to generate fixed-length packets by splitting a variable-length packet without requiring a memory for buffering.

Further, the configuration according to the first embodiment makes it possible to provide a demodulation method that is able to generate fixed-length packets by splitting a variable-length packet without requiring a memory for buffering.

Moreover, the configuration according to the first embodiment makes it possible to provide the transmitter 1 including the demodulation circuit 12 that is able to generate fixed-length packets by splitting a variable-length packet without requiring a memory for buffering.

<Modifications>

In the first embodiment, the packet header is to be inserted into each of the first three or four bytes of data in three split TLV packets. However, the present technology is not limited to such a configuration. More specifically, the packet header may be inserted into the first three or four bytes of data in at least either one of split TLV packets 1 and 2. Similarly, the packet header may be inserted into four consecutive bytes of data in split TLV packets 1, 2, and 3.

In the first embodiment, the speed (switching speed) for switching between the L and H levels of the clock signal is set in such a manner that the switching speed for only the first six or eight bytes of data in a split TLV packet is twice the switching speed for data subsequent to the first six or eight bytes of data. However, the present technology is not limited to such a configuration. More specifically, in a case where the beginning TLV instruction is not included in the split TLV packet to be converted, the switching speed for a larger number of bytes of data than the first six bytes of data may be set twice the switching speed for the other data. In this case, in addition to the other data and the data for which the switching speed is set twice the switching speed for the other data, the split TLV packet includes data for which the switching speed is set half the switching speed for the other data. Further, the amount of data for which the switching speed is set half the switching speed for the other data is the same as the amount of data exceeding six bytes.

Similarly, in a case where the beginning TLV instruction is included in the split TLV packet to be converted, the switching speed for a larger number of bytes of data than the first eight bytes of data may be set twice the switching speed for the other data. In this case, in addition to the other data and the data for which the switching speed is set twice the switching speed for the other data, the split TLV packet includes data for which the switching speed is set half the switching speed for the other data. Further, the amount of data for which the switching speed is set half the switching speed for the other data is the same as the amount of data exceeding eight bytes.

<Description of Computer to which Present Technology is Applied>

Incidentally, the above-described series of processing steps may be performed not only by hardware but also by software. In a case where the series of processing steps are to be performed by software, programs included in the software are installed, for example, on a computer incorporated in dedicated hardware from a recording medium. Alternatively, the programs included in the software may be installed from the recording medium, for example, on a general-purpose personal computer or other computer that is capable of performing various functions when various programs are installed on the computer.

Figure 12:
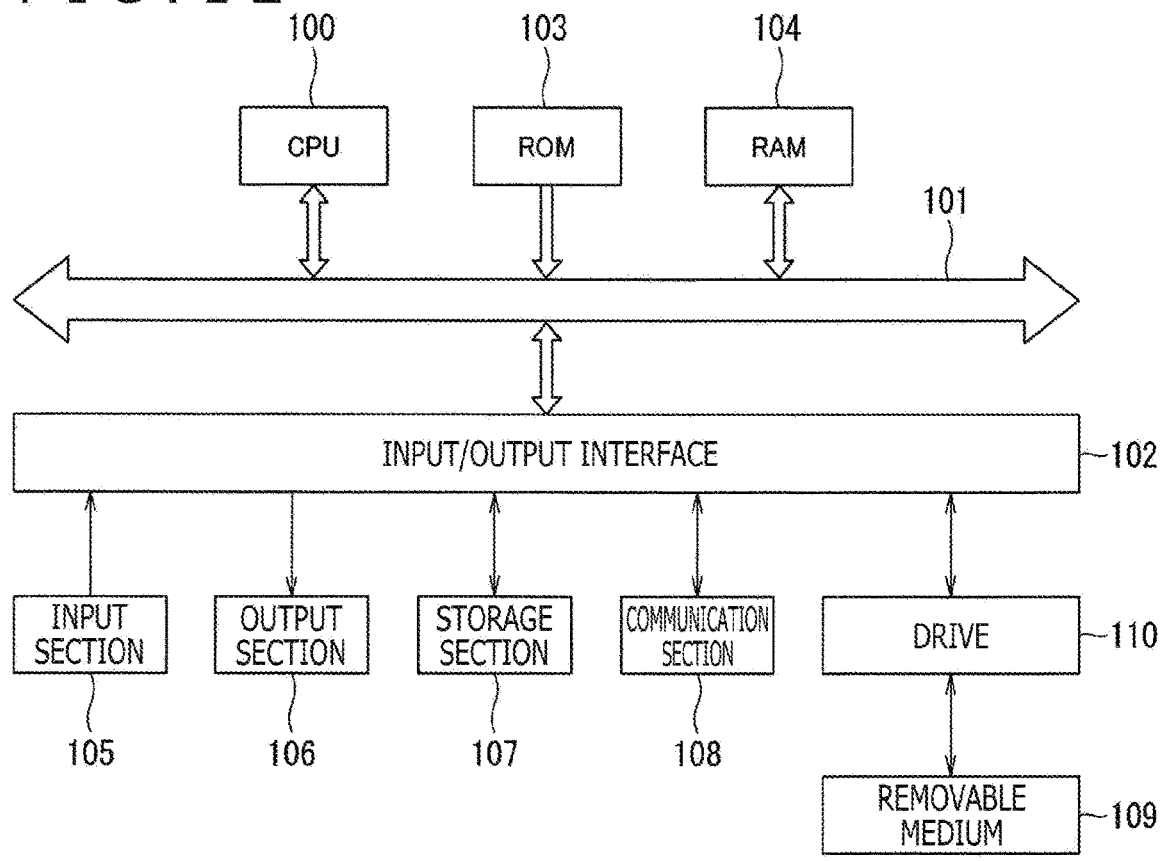
FIG. 12 is a diagram illustrating an example configuration of a personal computer.

FIG. 12 illustrates an example configuration of the general-purpose personal computer. A CPU (Central Processing Unit) 100 is built in the general-purpose personal computer. The CPU 100 is connected to an input/output interface 102 through a bus 101. The bus 101 is connected to a ROM (Read Only Memory) 103 and a RAM (Random Access Memory) 104.

The input/output interface 102 is connected to an input section 105 and an output section 106. The input section 105 is formed by a keyboard, a mouse, or other input device that allows a user to input an operation command. The output section 106 outputs a processing operation screen and a processing result image to a display device. The input/output interface 102 is further connected to a storage section 107 that includes, for example, a hard disk drive for storing programs and various data. Furthermore, the input/output interface 102 is connected to a communication section 108 that includes, for example, a LAN (Local Area Network) adapter and performs communication processing through a network represented by the Internet.

Moreover, the input/output interface 102 is connected to a magnetic disc (including a flexible disc) and an optical disc (including a CD-ROM (Compact Disc-Read Only Memory), and a DVD (Digital Versatile Disc). Additionally, the input/output interface 102 is connected to a drive 110 that reads data from and writes data onto a removable medium 109, such as a magneto-optical disc (including an MD (Mini Disc)) or a semiconductor memory.

The CPU 100 performs various processes in accordance with programs stored in the ROM 103 or with programs installed in the storage section 107 and loaded into the RAM 104 from the storage section 107. The program to be installed in the storage section 107 is read, for example, from the removable medium 109 such as the magnetic disc, the optical disc, the magneto-optical disc, or the semiconductor memory.

Further, the RAM 104 also stores, as appropriate, for example, data necessary for allowing the CPU 100 to perform various processes.

In the computer configured as described above, the CPU 100 performs the above-described series of processing steps, for example, by loading a program stored in the storage section 107 into the RAM 104 through the input/output interface 102 and the bus 101, and executing the loaded program.

The programs to be executed by the computer (CPU 100) can be recorded and supplied, for example, on the removable medium 109, which is formed as a package medium or the like. Further, the programs can be supplied through a wired or wireless transmission medium such as a local area network, the Internet, or a digital satellite broadcasting system.

The computer is configured such that the programs can be installed in the storage section 107 through the input/output interface 102 when the removable medium 109 is inserted into the drive 110. Further, the programs can be received by the communication section 108 through a wired or wireless transmission medium and installed in the storage section 107. Moreover, the program can be preinstalled in the ROM 103 or the storage section 107.

Here, the processes to be performed by the computer in accordance with the programs as described in this description need not always be conducted in a chronological order described by a flowchart in this description. More specifically, the processes to be performed by the computer in accordance with the programs include processes that are conducted parallelly or individually (e.g., parallel processing or object-based processing).

Further, the programs may be processed by a single computer (processor) or processed in a distributed manner by a plurality of computers. Furthermore, the programs may be transferred to and executed by a remote computer.

Moreover, the term "system" used in this description denotes an aggregate of a plurality of component elements (e.g., apparatuses and modules (parts)), and is applicable no matter whether all the component elements are within the same housing. Therefore, the term "system" denotes not only a plurality of apparatuses accommodated in separate housings and connected through a network, but also a single apparatus including a plurality of modules accommodated in a single housing.

Alternative Embodiments

While the embodiment of the present technology has been described, it is to be understood that the present technology is not limited to the foregoing description and drawings included in the present disclosure. Various alternative embodiments, working examples, and operational technologies will become apparent to those skilled in the art from the present disclosure. Further, the present technology obviously includes, for example, various embodiments not described in this description, such as alternative configurations appropriately based on various configurations described in conjunction with the foregoing embodiment. Therefore, the technical scope of the present technology is determined only by the matters specific to the invention that are defined by the appended claims based on the foregoing description.

Furthermore, the demodulation circuit, the demodulation method, and the transmitter according to the present disclosure need not include all the component elements described in conjunction, for example, with the foregoing embodiment, and may conversely include other component elements. It should be noted that advantages described in this description are merely illustrative and not restrictive. The present technology can additionally provide advantages other than those described in this description. For example, the present technology can be configured for cloud computing in which one function is shared by a plurality of apparatuses through a network in order to perform processing in a collaborative manner.

It is to be noted that the present technology is able to adopt the following configurations.

(1)

A demodulation circuit that, when a TLV packet superimposed on a broadcast wave and transmitted with a variable data length is to be converted to split TLV packets with a fixed data length, sets a speed for switching between L and H levels of a clock signal in such a manner that the speed for first data including a packet header to be embedded in a header section of the split TLV packets is twice the speed for data subsequent to the first data.

(2)

The demodulation circuit as described in (1) above, in which, in a case where the split TLV packets do not include a beginning TLV instruction indicating that a beginning of the TLV packet is included, a speed for switching between the L and H levels of the clock signal is set in such a manner that the speed for only first six bytes of data in the split TLV packets is twice the speed for data subsequent to the first six bytes of data, and in a case where the split TLV packets include the beginning TLV instruction, the speed for switching between the L and H levels of the clock signal is set in such a manner that the speed for only first eight bytes of data in the split TLV packets is twice the speed for data subsequent to the first eight bytes of data.

(3)

A demodulation method that, when a TLV packet superimposed on a broadcast wave and transmitted with a variable data length is to be converted to split TLV packets with a fixed data length, sets a speed for switching between L and H levels of a clock signal in such a manner that the speed for first data including a packet header to be embedded in a header section of the split TLV packets is twice the speed for data subsequent to the first data.

(4)

The demodulation method as described in (3) above, in which, in a case where the split TLV packets do not include a beginning TLV instruction indicating that a beginning of the TLV packet is included, the speed for switching between the L and H levels of the clock signal is set in such a manner that the speed for only first six bytes of data in the split TLV packets is twice the speed for data subsequent to the first six bytes of data, and in a case where the split TLV packets include the beginning TLV instruction, the speed for switching between the L and H levels of the clock signal is set in such a manner that the speed for only first eight bytes of data in the split TLV packets is twice the speed for data subsequent to the first eight bytes of data.

(5)
A transmitter including:
a demodulation circuit that, when a TLV packet superimposed on a broadcast wave and transmitted with a variable data length is to be converted to split TLV packets with a fixed data length, sets a speed for switching between L and H levels of a clock signal in such a manner that the speed for first data including a packet header to be embedded in a header section of the split TLV packets is twice the speed for data subsequent to the first data; and
a transmitting-side back-end processing circuit that QAM-modulates a signal demodulated by the demodulation circuit for cable broadcasting purposes.

(6)
The transmitter as described in (5) above,
in which, in a case where the split TLV packets do not include a beginning TLV instruction indicating that a beginning of the TLV packet is included, the demodulation circuit sets the speed for switching between the L and H levels of the clock signal in such a manner that the speed for only first six bytes of data in the split TLV packets is twice the speed for data subsequent to the first six bytes of data, and in a case where the split TLV packets include the beginning TLV instruction, the demodulation circuit sets the speed for switching between the L and H levels of the clock signal in such a manner that the speed for only first eight bytes of data in the split TLV packets is twice the speed for data subsequent to the first eight bytes of data.

REFERENCE SIGNS LIST

1: Transmitter
11: Transmitting-side tuner
12: Demodulation circuit
12a: Transmitting-side front-end processing circuit
12b: Fixed-length packet generation section
13: Transmitting-side back-end processing circuit
2: Receiver
21: Receiving-side tuner
22: Receiving-side front-end processing circuit
23: Receiving-side back-end processing circuit
3: Network
4: Antenna
5: Display
10: Broadcasting system
100: CPU
101: Bus
102: Input/output interface
103: ROM
104: RAM
105: Input section
106: Output section
107: Storage section
108: Communication section
109: Removable medium
110: Drive

The invention claimed is:

1. A demodulation circuit, comprising:
a first circuit portion configured to convert a TLV packet superimposed on a broadcast wave and transmitted with a variable data length to split TLV packets with a fixed data length; and
a second circuit portion configured to set a speed for switching between L and H levels of a clock signal in a case where the TLV packet is converted to the split TLV packets with the fixed data length, wherein the speed is set that the speed for first data including a packet header to be embedded in a header section of the split TLV packets is twice the speed for data subsequent to the first data.

2. The demodulation circuit according to claim 1, wherein,
in a case where the split TLV packets do not include a beginning TLV instruction indicating that a beginning of the TLV packet is included, the second circuit portion is further configured to set the speed for the switching between the L and H levels of the clock signal such that the speed for first six bytes of data in the split TLV packets is twice the speed for data subsequent to the first six bytes of data, and
in a case where the split TLV packets include the beginning TLV instruction, the second circuit portion is further configured to set the speed for the switching between the L and H levels of the clock signal such that the speed for first eight bytes of data in the split TLV packets is twice the speed for data subsequent to the first eight bytes of data.

3. A demodulation method, comprising:
setting a speed for switching between L and H levels of a clock signal in a case where a TLV packet superimposed on a broadcast wave and transmitted with a variable data length is to be converted to split TLV packets with a fixed data length, wherein the speed is set such that the speed for first data including a packet header to be embedded in a header section of the split TLV packets is twice the speed for data subsequent to the first data.

4. The demodulation method according to claim 3, wherein,
in a case where the split TLV packets do not include a beginning TLV instruction indicating that a beginning of the TLV packet is included, the speed for the switching between the L and H levels of the clock signal is set such that the speed for first six bytes of data in the split TLV packets is twice the speed for data subsequent to the first six bytes of data, and
in a case where the split TLV packets include the beginning TLV instruction, the speed for the switching between the L and H levels of the clock signal is set such a that that the speed for first eight bytes of data in the split TLV packets is twice the speed for data subsequent to the first eight bytes of data.

5. A transmitter, comprising:
a demodulation circuit configured to set a speed for switching between L and H levels of a clock signal in a case where a TLV packet superimposed on a broadcast wave and transmitted with a variable data length is to be converted to split TLV packets with a fixed data length, wherein the speed is set such that the speed for first data including a packet header to be embedded in a header section of the split TLV packets is twice the speed for data subsequent to the first data; and
a transmitting-side back-end processing circuit configured to QAM-modulate a signal demodulated by the demodulation circuit for cable broadcasting.

6. The transmitter according to claim 5, wherein,
in a case where the split TLV packets do not include a beginning TLV instruction indicating that a beginning of the TLV packet is included, the demodulation circuit is further configured to set the speed for the switching between the L and H levels of the clock signal such that the speed for first six bytes of data in the split TLV packets is twice the speed for data subsequent to the first six bytes of data, and in a case where the split TLV packets include the beginning TLV instruction, the demodulation circuit is further configured to set the speed for the switching between the L and H levels of the clock signal such that the speed for first eight bytes of data in the split TLV packets is twice the speed for data subsequent to the first eight bytes of data.

\* \* \* \* \*